May 19, 1925. 1,538,356
S. SCHIFF
CENTRIFUGAL SIFTER
Filed May 12, 1920  4 Sheets-Sheet 2

Inventor
Sigmund Schiff
By Walter H. Murray
Attorney

Patented May 19, 1925.

1,538,356

UNITED STATES PATENT OFFICE.

SIGMUND SCHIFF, OF CINCINNATI, OHIO.

CENTRIFUGAL SIFTER.

Application filed May 12, 1920. Serial No. 380,893.

*To all whom it may concern:*

Be it known that I, SIGMUND SCHIFF, a petitioner for citizenship in the United States of America, and a resident of Cincinnati, in the county of Hamilton and State of Ohio, have invented a new and useful Improvement in Centrifugal Sifters, of which the following is a specification.

An object of my invention is to provide a sifter for such substances as flour, chemicals, etc., as may be developed into powder form, that will perform such work quickly and efficiently.

Another object of my invention is to provide a device that may be utilized to scent or treat toilet, medicated, and other powders while they are being sifted.

Another object is to provide a device whereby flour for baking purposes may be mechanically and quickly aerated and sifted. This device can be utilized to raise the temperature of the flour to the desired degree for mixing purposes, thereby permitting the percentage of moisture content of the dough to be raised. This aerating and raising of the temperature make it unnecessary that large bakering concerns keep large quantities of flour in stock in order that the flour may undergo similar natural conditioning.

These and other objects are attained by the means described herein and disclosed in the accompanying drawing in which.

Figure 1:
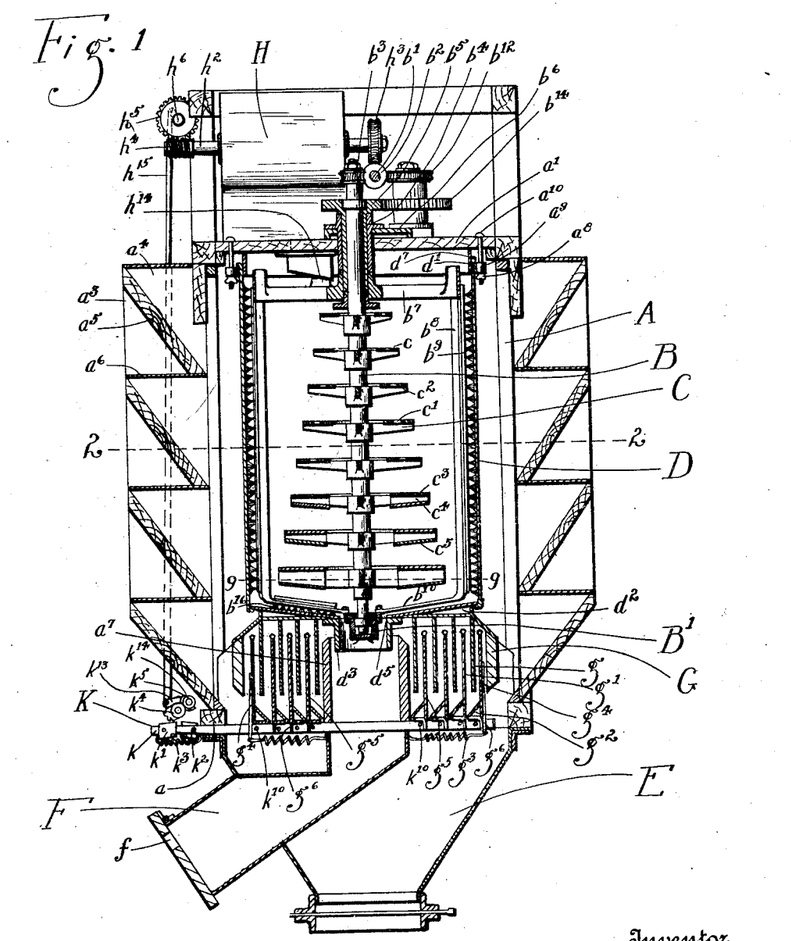
Fig. 1 is a sectional elevation of a sifter embodying my invention.
Figure 2:
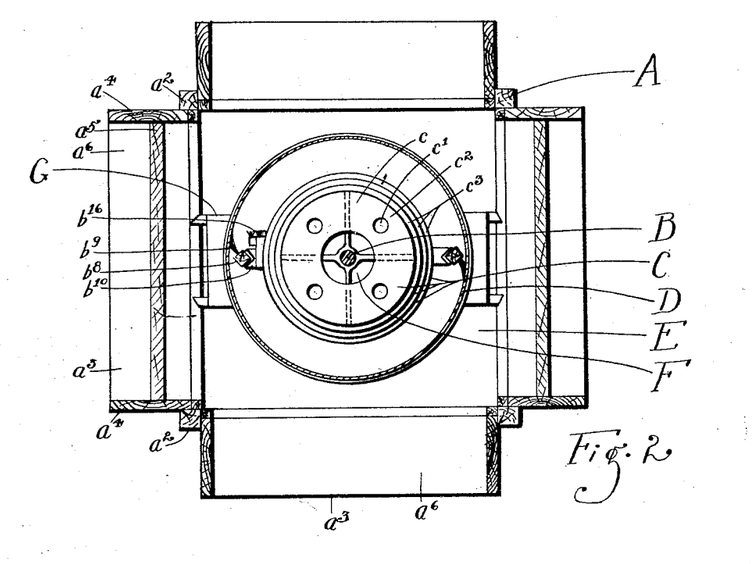
Fig. 2 is a plan view on line 2—2 of Fig. 1.
Figure 3:
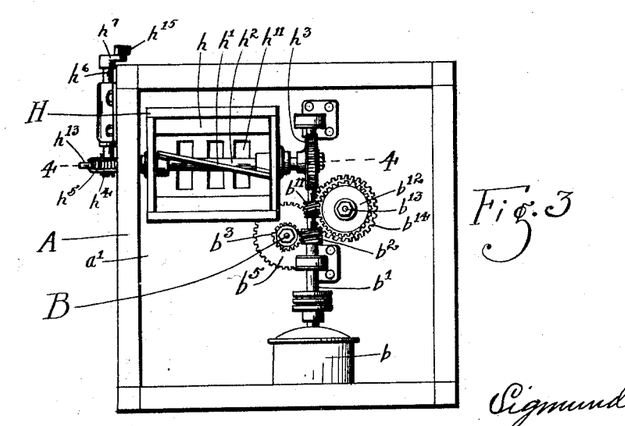
Fig. 3 is a plan of the driving mechanism and the agitator forming a detail of my invention.
Figure 4:
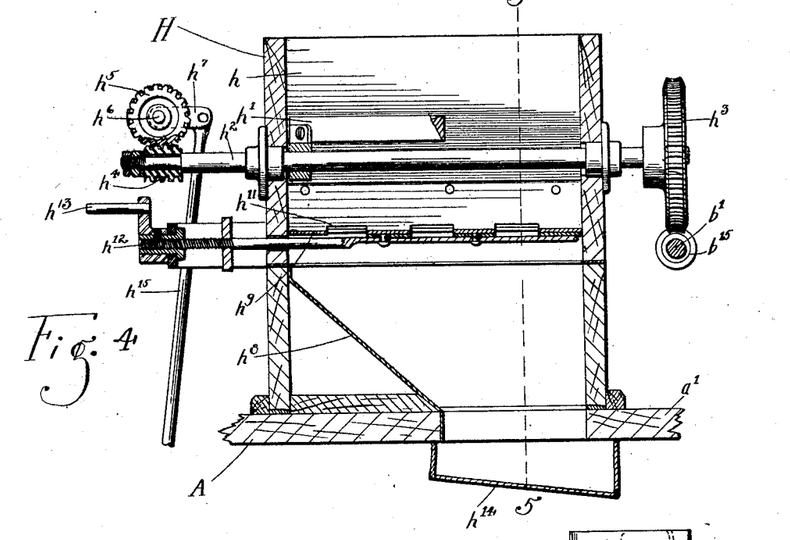
Fig. 4 is an enlarged sectional view on line 4—4 of Fig. 3.
Figure 5:
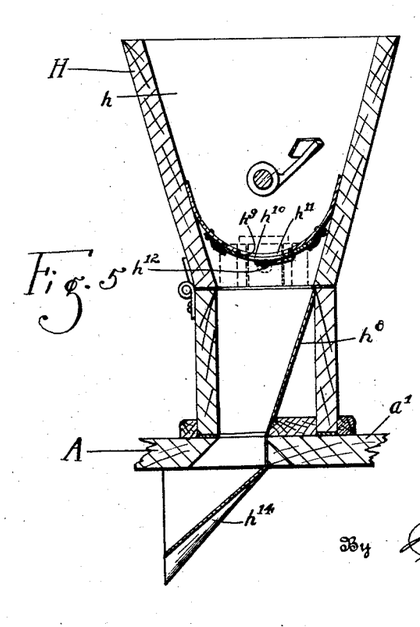
Fig. 5 is a sectional view on line 5—5 of Fig. 4.
Figure 6:
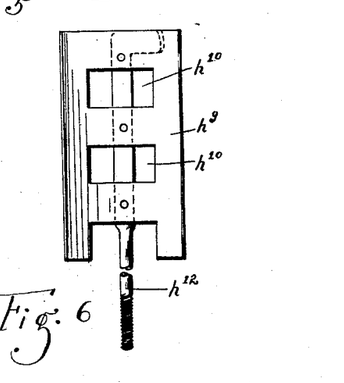
Fig. 6 is an enlarged plan view of the feeding slide forming a detail of my invention.
Figure 7:
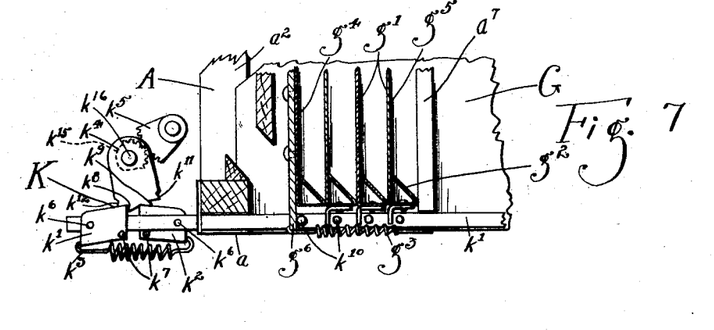
Fig. 7 is an enlarged elevation of the dust collector device and cleaner for such device forming details of my invention.
Figure 8:
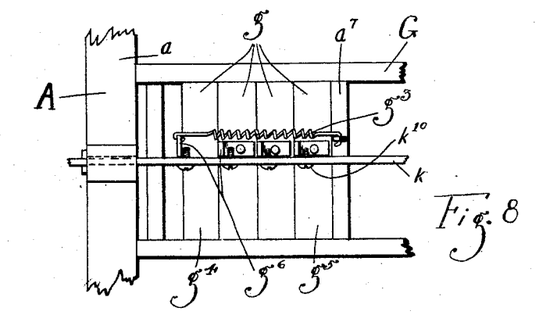
Fig. 8 is an inverted plan view of the dust collector device shown in Fig. 7.
Figure 9:
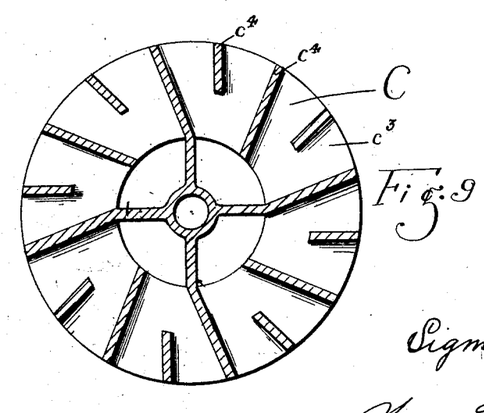
Fig. 9 is an enlarged sectional view on line 9—9 of Fig. 1.

My invention comprises a casing A within which is mounted a rotatable shaft B. A series of disks C are mounted on the shaft. The substance to be sifted is disposed upon these disks and by the combined effect of centrifugal force and the wind resulting from the revolving of the disks, some of which have fan blades, $c^4$, the bunches of adhering substance are broken up and thrown against a screen D. The fine particles of the substance pass thru the screen, after which they settle in the hopper E and upon the slides $a^5$ and fall therefrom to the hopper E. The grit and heavy substances that cannot pass thru the screen, fall to the bottom of the device and are caught in a tailing box F.

The casing A is preferably square in cross section, and has a base $a$ and top $a'$, secured to one another by means of the uprights $a^2$. Extending outwardly from between the base $a$ and the top $a'$ are a series of wings $a^3$. These wings $a^3$ comprise vertical supports $a^4$ between which are secured a series of inclined slides $a^5$. The lower ends of the slides extend toward the center of the casing. A substance $a^6$, such as muslin, impervious to the substance to be sifted, extends from the lower edge of one slide to the upper edge of the slide next below, thereby closing the sides of the casing. Attached to the base and extending upward therefrom is a duct $a^7$ communicating with a tailing box F. The wing nuts $a^8$ support collar $a^9$ upon the bolts $a^{10}$ passing thru the top of the casing. The collar supports the screen D.

Suspended centrally within the casing and from the top thereof is a shaft B. Suitable driving mechanism is mounted upon the top $a'$, whereby the shaft B may be rapidly revolved. This mechanism comprises a motor or pulley $b$. A shaft $b'$ connects with the motor $b$ and has a worm gear $b^2$ mounted upon it that engages with pinion $b^3$, secured upon the shaft B. The shaft B is mounted within a sleeve $b^4$ having a gear $b^5$, formed on one end thereof. The sleeve is adapted to revolve about the shaft B. The sleeve $b^4$ is rotatably mounted within the bearing $b^6$ attached to and extending thru the top of the casing. Inside of the casing and attached to the sleeve $b^4$ are the brush arms $b^7$. Extending vertically downward from the brush arms are the brush carriers $b^8$. The brushes $b^9$ are mounted upon the brush carriers and engage the inner surface of screen D, suspended within the casing A. The sleeve $b^4$, attached to the brush arms, is adapted to be rotated by means of the worm gear $b^{11}$ mounted on shaft $b'$ and engaging pinion $b^{12}$ on stud shaft $b^{13}$. The gear $b^{14}$ is secured to pinion $b^{12}$ and engages gear $b^5$ formed on sleeve $b^4$. A worm $b^{15}$ on the shaft $b'$ is adapted to engage pinion $h^3$ of the feedhopper H. The bearing B′ is mounted upon the lower end of the shaft B. The lower end $b^{10}$ of the brush arms extend centerward and are revolubly mounted on bearing B′. Brushes $b^{16}$ are secured upon the under side of ends $b^{10}$ of the brush arms.

The disks C are mounted at intervals upon the shaft B. The disks have horizontal upper surfaces $c$. A series of apertures $c'$ are formed thru the upper disks $c^2$. The three lowest disks $c^3$ have fan blades $c^4$. The disks $c^3$ are of compound construction having a lower disk $c^5$ attached to the bottom of the fan blades.

The screen D is constructed from any suitable material such as silk or metal according to the substance that is to be sifted. The screen is suspended from the top $a'$ of the casing by means of an adjustable collar $a^9$ adapted to engage the hoop $d^7$ secured to the upper edge of the screen D, and to press the screen firmly against the stationary ring $d'$, secured to the under surface of the top $a'$. The base of the screen is secured upon the outer edge of a conical disk $d^2$. The screen is stretched by tightening the wing nuts $a^8$. The disk $d^2$ is imperforate, except for the hole $d^5$ at its apex, and is attached to a collar $d^3$ extending inside the duct $a^7$. The lower ends $b^{10}$ of the brush arms extend centerward, parallel to the inner surface of the baffle or the disk $d^2$. The brushes $b^{16}$ engage the inner surface of the disk $d^2$.

A rectangular box G extends transversely across the center of the bottom $a$ on the inside of the casing. A series of vertically parallel sheets $g$ are suspended transversely from the top of the box. Pivotally suspended from the inner sides of the box and between the parallel sheets are a series of hinged partitions $g'$. Near the bottom of the partitions are formed inclined surfaces or slides $g^2$, extending away from the partitions to which such slide is attached. The lower end of each slide engages the next adjacent partition. The centermost partition $g^5$ has its slide normally engaging the outer surface of duct $a^7$. The lugs $g^6$ on the under side of the partitions extend downward beyond a series of pins $k^{10}$ on the horizontal bar $k$ of the rocking device K. The partition $g^4$, farthest removed from the duct $a^7$ has one end of a spring $g^3$ attached to its lug $g^6$, the other end of the spring being secured to the duct $a^7$, whereby the inclined slides $g^2$ are held in contact with the duct $a^7$ and the adjacent partitions. Two of the pins $k^{10}$ normally engage the two lugs $g^6$ on partitions $g^4$, and the other pins are successively spaced at increasing intervals from the successive partitions in the order of their removal from partitions $g^6$. These pins are spaced from the partitions toward the duct $a^7$, whereby, when the bar $k$ is reciprocated by the rocking device K, the partitions on opposite sides of the duct $a^7$ are alternately moved away from the partition adjacent thereto so that all the slides $g^2$ adjacent to such slides $g^4$ can discharge any substance precipitated upon such slides. The spring $g^3$ returns the partitions and slides to their normal positions when the bar $k$ is released.

The bar $k$ is part of the rocking device K comprising the bar $k$, the pawls $k'$ and $k^2$ pivotally mounted upon the bar, a spring $k^3$ adapted to hold the pawls in their normal positions, and the meshing gear segments $k^5$ and $k^{15}$, and ratchet block $k^4$. The pawls $k'$ and $k^2$ are attached to the bar by pivots $k^6$. The pins $k^7$ are attached to the blocks and serve to prevent either pawl being pulled upward from their normal positions, but will not interfere with the pawls being moved downward. The spring $k^3$ holds the pawls in their normal positions with the pins $k^7$ engaging the bar $k$. The ratchet $k^4$ and the gear segment $k^{15}$ are mounted upon shaft $k^{16}$, the ratchet $k^4$ having the teeth $k^8$ and $k^9$ formed thereon. The teeth $k^8$ and $k^9$ are adapted to engage the pawls $k'$ and $k^2$ respectively. The crank $k^{13}$, similar to but longer than crank $h^7$ is attached to the segment $k^5$. The rotary movement of the shaft $h^6$ is converted into an oscillatary movement of the segments $k^5$ and $k^{15}$ by means of the rod $h^{15}$ extending from the crank $h^7$ to crank $k^{13}$.

The feedhopper H is mounted upon the upper side of the top $a'$, and comprises a chamber $h$ within which an agitator $h'$ is adapted to be revolved. The agitator $h'$ is mounted on shaft $h^2$, extending thru the wall of the casing. A pinion $h^3$ on shaft $h^2$ engages the worm $b^{15}$ upon the shaft $b'$. The other end of the shaft $h^2$ extends thru and beyond the other wall of the chamber $h$ and has a worm $h^4$, engaging the pinion $h^5$ upon the shaft $h^6$. The crank $h^7$ is secured upon shaft $h^6$. The chamber $h$ communicates with the inside of the screen D by means of a chute $h^8$. A slide $h^9$ engages the base of chamber $h$, and has a series of perforations $h^{10}$, that may be moved to register with perforation $h^{11}$ formed in the bottom of the chamber $h$, whereby the feed of the substance within the chamber $h$ to the interior of the screen D is controlled. A shank $h^{12}$ formed on slide $h^9$ extends thru the wall of the chamber $h$ and is screw threaded. A screw device $h^{13}$ is adapted to move the slide so that the perforations $h^{10}$ register with the perforations $h^{11}$ in the bottom chamber $h$. At the end of the chute $h^8$ leading to the interior of the screen D is a tilting plate $h^{14}$ that is engaged by the revolving brush arms $b^7$ thereby keeping the tilting plate in constant vibration and assuring an even feed of substance from the whole length of edge $h^{14}$ of the tilting plate to the disks. Attached to the crank $h^7$ and extending downwardly beside the casing A is a rod $h^{15}$. This rod actuates the rocking device K.

In the operation of the sifter, the ground substance is deposited into the feedhopper H. The agitator $h'$ stirs up the substance and feeds it thru the feed chute $h^8$ to the tilting plate and the disks C. The amount fed can be controlled by means of the perforated slide $h^9$. The edge $h^{14}$ of the tilting plate is so placed over the revolving disks C, that the upper five disks receive material direct from the plate $h^{14}$ as the material slides off and falls down from the tilting plate. Each disk except the first one will receive any additional amount from the disk right above it, which falls thru the holes $c$, and over the edges of such upper disk. Fine particles have a tendency of bunching or cohering and these bunches, constituting the heavier masses, will fall from disk to disk because they are thrown off the disk upon which they fall, by the centrifugal force exerted upon them, and as they repeatedly fall upon the disks, the bunches are broken up. The wind created by the fans, cooperates with the action of the disks in this breaking up of the bunches. The fine particles of substance are carried by the centrifugal force exerted upon them and by the wind, from the disks to the screen D. It takes only an instant for a quantity of material fed into the machine at that instant, to be distributed all over the surface of the screen D. The wind will blow some of the particles thru the mesh of the screen, other particles which hit the screen are arrested in their forward movement, with the result that they will bunch and block the openings of the screen and the following particles will be unable to pass thru the screen. The wind current is arrested and turned into pressure holding these particles on the screen, preventing them from falling into the tailing box. To break up this clogged condition, the brush arms $b^7$ are revolved interiorly to the screen. As they revolve, the brushes $b^9$ disengage any of the substance that may adhere to the screen, the siftable substance then passing thru the screen and the tailings falling upon the baffle $d^2$. The brushes $b^{16}$ then brush the tailings to the discharge opening $d^5$ and the tailings fall into the tailing box F. As the brush arms $b^7$ revolve they engage the tilting plate $h^{14}$ suspended below the feed opening, keeping the tilting plate under vibration, thereby causing the substance to fall in even quantities upon the upper disks.

The sifted substance having passed thru the screen is no longer subjected to the violent air current that blew it thru the screen, because the muslin closures $a^6$ and the slides $a^5$ around the screen constitute an expansion collector. The air entering this expansion collector thru the screen, escapes thru the muslin partitions $a^6$ thereby reducing the air pressure within the expansion collector practically to the atmospheric, and therefor the particles carried by the air will settle in the hopper E and upon the inclined slides $a^5$. It should be noted that the large chamber referred to as an expansion chamber or collector and containing the screen is in direct communication with the atmosphere thru the muslin or air-pervious partitions. In other words, the expansion collector is the atmosphere itself, while the muslin partitions and slides of the expansion collector serve merely to confine the dust that is precipitated as a result of the relieving of the pressure outside of the srceen to which the dust is subjected interiorly of the screen. An expansion collector is therefore to be understood as being a device wherein atmospheric pressure condition prevails as distinguished from an enclosed channel or duct or the like thru which an air current must pass and thru which dust in suspension would pass. From time to time the substance upon the inclined slides will slip off such surfaces and fall into the hopper E. The fans draw the fresh air supply thru the opening $f$ in the tailing box cover and thru aperture $d^5$ and will thereby draw the rest of the dust laden air from around the screen, thru the dust collector G, cooperating with the air pervious muslin partitions in reducing the air pressure within the expansion collector to the atmospheric.

The air current passing thru the dust collector G because of the action of the fans, will carry a little of the sifted substance; therefore I have provided the precipitating means comprising the parallel sheets and partitions in the dust collector G. As the air moves thru the circuitous passage between the vertical sheets $g$ and partitions $g'$, this substance will settle upon the inclined surfaces $g^2$, so that by the time this air reaches the discharge opening $d^5$, practically no substance will be carried by the air. Even though some substance were carried, by the air, the substance would be carried up inside the screen and would again be blown thru the screen. This assures a maximum of efficiency and a minimum of tailings. From time to time the bar $k$ is reciprocated by the device K, whereupon the partitions on opposite sides of duct $a^7$ are alternately drawn backward by means of the pins $k^{10}$, thereby permitting the substance upon the inclined slides $g^2$ to fall into the hopper. As soon as the rod $k$ has been moved to its limit in one direction it is released by the mechanism K and the springs $g^3$ then return the partitions to their normal positions and close the bottom of the dust collector.

The mechanism K is operated by means of a rod $h^{15}$. As previously explained, the rotary motion of shaft $h^6$ is converted into an oscillatory motion of the segment $k^5$. The gear teeth formed on segment $k^5$ impart the oscillatory motion to segment $k^{15}$ and ratchet $k^4$. The pawls $k'$ and $k^2$ are adapted to resist any upward pull or force exerted upon them but will yieldingly resist any downward force exerted upon them, whereby the teeth $k^8$ and $k^{12}$ on ratchet $k^4$ will engage the pawl $k'$ when the ratchet is moved in a clockwise direction and teeth $k^9$ and $k^{11}$ will engage the pawl $k^2$ when the ratchet is moved in a counter clockwise direction thereby alternately moving the rod $k$ forward and backward and jolting the rod as the teeth $k^{11}$ and $k^{12}$ slip off the pawls $k'$ and $k^2$. When the ratchet $k^4$ has moved far enough in either direction the pawl disengages from the teeth $k^8$ or $k^9$, and bar $k$ is released. Spring $g^3$ then moves the partitions $g'$ to their normal positions; the pins $k^{10}$ moving bar $k$ to its normal position.

If the substance being sifted is to be scented, medicated, aerated, or its temperature raised, the heated air or the air carrying the scenting or medicating material is injected into the tailing box thru the aperture $f$ and is drawn thru the duct $a^7$ and discharge opening $d^5$ into the cylindrical screen where it comes in contact with the siftable substance, thereby aerating, scenting or medicating the substance.

What I claim is:

1. In a sifting device the combination of a casing, a cylindrical screen within the casing and spaced therefrom, the screen having a discharge opening in its bottom, means to move a siftable substance thru the screen, a series of inclined slides mounted upon the casing adjacent to the screen and having their inclined upper surfaces exposed to the screen and covers adapted in combination with the slides and casing to enclose the screen.

2. In a sifting device the combination of a casing having a feed port in its top, a cylindrical screen within the casing and spaced therefrom, a series of perforated disks mounted horizontally within the casing, the disks varying in diameter, each disk being larger than the one next above and through the perforations of which a siftable substance may be distributed upon the lower disks, and means to revolve the disks.

3. In a sifting device the combination of an air pervious casing impervious to the substance to be sifted in lieu thereof, a vertical screen within the casing, and spaced therefrom, the casing having a feed opening in its top registering with the interior of the screen, a feed hopper communicating with the feed opening, and means adapted to move a siftable substance through the screen.

4. In a sifting device the combination of a casing, a cylindrical screen within the casing and spaced therefrom, a feed hopper, a feed chute extending from the feed hopper to the interior of the screen, a vertical revoluble shaft interiorly to the screen and horizontal perforated disks mounted on the shaft, each successive disk extending beyond the disk next above, the feed chute extending over the outer edges of the disks for simultaneously distributing a siftable substance over the outer edges of the disks.

5. In a sifting device the combination of a casing, a cylindrical screen within the casing and spaced therefrom, the casing having a feed opening in its top registering with the interior of the screen, a feed hopper having a perforated bottom, a slide engaging the bottom of the hopper, and a feed chute extending from the bottom of the hopper to the feed opening, means within the screen adapted to throw a siftable substance through the screen, and a vibrating plate below the feed chute adapted to direct a siftable substance from the feed opening to the substance throwing means.

6. In a sifting device the combination of a casing, a cylindrical screen within the casing, the screen having a discharge opening in its bottom, a series of fans within the screen, adapted to move a siftable substance thru the screen, a series of vertically parallel sheets suspended below the screen, a series of vertical partitions, projecting upward between the sheets and forming a circuitous passage from the chamber between the casing and the screen, to the discharge opening in the screen.

7. In a sifting device the combination of a series of vertically suspended parallel sheets, vertical partitions projecting upward between the parallel sheets and forming a circuitous passage between the partitions and sheets, inclined slides formed on the partitions and means to open the circuitous passage between the partitions and adjacent to the inclined slides.

8. In a sifting device the combination with a casing of a cylindrical screen within the casing and spaced therefrom, a revoluble shaft interiorly to the screen, a series of horizontal disks mounted upon the shaft, and fan blades upon the disks, the disks and fans cooperatively driving a siftable substance through the screen.

9. In a sifting device the combination with a casing of a cylindrical screen suspended vertically from the casing, a revoluble shaft interiorly to the screen, perforated disks mounted horizontally upon the shaft through the perforations of which the siftable substance may be distributed upon the lower disks, other disks mounted horizontally upon the shaft subjacent to the perforated disks and fan blades mounted upon the second mentioned disks.

10. In a sifting device the combination with a sifting screen, of an expansion collector surrounding and spaced from the screen, a dust collector disposed below the screen, and having one of its ends communicating with the space between the screen and the expansion collector and having its other end communicating with the interior of the screen, and means to automatically clean the dust collector.

11. In a sifting device the combination of a screen, means adapted to throw a siftable substance thru the screen, superimposed inclined slides sloping downwardly toward the screen, and coverings, impervious to the sifted substance, closing the space between the screen and the upper edge of the uppermost slide and the spaces between the lower edge of any slide and the upper edge of the slide next below.

12. In a sifting device the combination of a screen, means adapted to throw a siftable substance thru the screen, a series of inclined slides in vertical alignment and sloping downwardly toward the screen, a covering, impervious to the siftable substance, extending from the screen to the upper edge of the uppermost slide, similar coverings extending from the lower edge of each slide to the upper edge of the slide next below and a hopper disposed below the bottom slide communicating with the space between the screen and the slides.

13. In a sifting device the combination with a screen of an expansion collector surrounding the screen and comprising a series of horizontal covers adapted to permit the passage of air but impervious to a siftable substance, said covers having their under surfaces exposed to the sifted substance, and means to support the covers adjacent to the screen.

14. In a sifting device the combination with a casing of a cylindrical screen suspended within the casing, an expansion collector around the screen, said expansion chamber comprising air-pervious walls for attaining an atmospheric pressure condition about said screen, a hopper below the expansion collector into which the expansion collector discharges and a dust collector between the screen and the hopper communicating with the expansion collector and adapted to discharge into the hopper.

15. In a sifting device the combination with a casing of a cylindrical screen within the casing and having a discharge opening in its bottom, an expansion collector around the screen, said expansion chamber comprising air-pervious walls for attaining an atmospheric pressure condition about said screen, a hopper below the expansion collector, a dust collector between the screen and the hopper, and a tailing box registering with the central discharge opening.

16. In a sifting device the combination of a casing, a vertical revoluble shaft extending into the casing, a cylindrical screen having a discharge opening in its bottom disposed vertically within the casing and spaced therefrom and extending about the shaft, the shaft and the screen being substantially concentric, the casing having a feed opening in its top registering with the interior of the screen, and a series of horizontal disks spacedly mounted on the shaft intermediate the feed opening and the discharge opening, each disk extending radially outward beyond the disk next above, the disks being adapted to throw a siftable substance through the screen, and fan blades upon the disks adapted to force the siftable substance through the screen.

17. In a sifting device the combination of a casing, a cylindrical screen within the casing and spaced therefrom, the casing having a feed opening in its top registering with the interior of the screen, the screen having a discharge opening in its bottom, means interiorly to the screen adapted to move a siftable substance through the screen, and means moving between the siftable substance moving means and the screen and removing from the screen any substance adhering thereto.

18. In a sifting device the combination of a casing, a vertical screen within the casing and spaced therefrom and having a feed opening in its top, the casing having a feed hopper communicating with the feed opening, means adapted to move a siftable substance through the screen, a plate mounted adjacent the feed opening adapted to receive a siftable substance from the feed opening and to distribute the substance over the throwing means, and means to vibrate the plate.

19. In a sifting device the combination of a casing, a cylindrical screen within the casing and spaced therefrom, a revoluble shaft disposed interiorly of the screen, a series of horizontal disks mounted upon the shaft adapted to move a siftable substance through the screen, fan blades mounted upon the disks adapted to create an air draft co-operating with the disks in driving the siftable substance through the screen, and brushes revolubly mounted upon the shaft and adapted to be moved over the entire interior surface of the screen.

20. In a sifting device, the combination of a series of overlapping partitions extending in substantial parallelism for forming a circuitous passage, and means for automatically cleaning the circuitous passage.

21. In a sifting device the combination of a casing, a vertical cylindrical screen within the casing and spaced therefrom, a revoluble vertical shaft within the screen, horizontal discs mounted upon the shaft, the discs varying in diameter and each succeeding disc being larger than the one next above, and means for brushing the entire inner surface of the cylindrical screen.

22. In a sifting device the combination of a casing, a vertical cylindrical screen within the casing and spaced therefrom, a revoluble vertical shaft within the screen, horizontal discs mounted upon the shaft, the discs varying in diameter and each succeeding disc being larger than the one next above, fan blades associated with the vertical shaft for creating a pressure condition within the cylindrical screen, and means for brushing the entire inner surface of the cylindrical screen.

23. In a sifting device the combination of a casing, a cylindrical screen within the casing and spaced therefrom, a perforate baffle at the base of the screen, means for moving a siftable substance through the screen, means for admitting a siftable substance into the screen at the top thereof and for directing the siftable substance to the first mentioned means, and means passing between the moving means and the screen for co-operation with the moving means in passing the siftable substance through the screen and for removing from the entire inner surface of the screen any substance incapable of passing through the screen.

24. In a sifting device the combination of a casing having a feed port in its top, a cylindrical screen suspended within the casing and spaced therefrom, a series of horizontally disposed perforated discs mounted for rotation about a vertical axis and within the casing, the perforations in the discs providing vertical openings in the discs and each succeeding disc extending beyond the disc next above whereby upon the discharge of a siftable substance upon the uppermost disc some of the siftable substance may pass downwardly beyond the uppermost disc to the succeeding lower disc whereby to simultaneously distribute the siftable substance over the plurality of discs, and means for revolving the discs, the discs being disposed below the feed port in the top of the casing.

25. In a sifting device the combination of a sifting screen having a chamber therein, an expansion collector surrounding the screen and spaced therefrom, a dust collector communicating with the interior of the screen and the expansion collector, and through which dust collector air may move from the expansion collector to the interior of the screen, and means for automatically cleaning the dust collector.

26. In a sifting device the combination of a casing, a vertical revoluble shaft extending into the casing, a cylindrical screen having a discharge opening in its bottom disposed vertically within the casing and spaced therefrom and extending about the shaft, the shaft and the screen being substantially concentric, the casing having a feed opening in its top registering with the interior of the screen, and a series of horizontal discs spacedly mounted on the shaft intermediate the feed opening and the discharge opening, each succeeding disc extending radially outward beyond the disc next above, the discs being adapted to throw a siftable substance through the screen, and revoluble fan blades within the casing for forcing the siftable substance through the screen.

27. In a sifting device the combination of an air pervious casing exposed to the atmosphere, the casing being impervious to the substance to be sifted whereby to provide an expansion chamber within which chamber there is attained a substantially atmospheric pressure condition, a screen within the chamber, spaced from the walls thereof and exposed on one side to the substantially atmospheric pressure condition, the casing having a feed opening in its top registering with the opposite side of the screen, the screen having a discharge opening in its bottom, and means comprising revolving disks and fan blades interiorly to the screen adapted to move a siftable substance through the screen and to set up within the screen a pressure condition in excess of the said atmospheric pressure condition.

28. In a sifting device the combination with a casing, of a cylindrical screen within the casing and spaced therefrom, a revoluble shaft interiorly of the screen, a series of horizontal spaced disks, succeeding descending disks increasing in diameter, mounted upon the shaft, and revoluble fan blades within the casing, the disks and fan blades co-operatively driving a siftable substance through the screen.

29. In a sifting device the combination of a casing, a cylindrical screen within the casing and spaced therefrom, a revoluble shaft disposed interiorly of the screen, a series of spaced horizontal disks, succeeding descending disks increasing in diameter, mounted upon the shaft adapted to move a siftable substance through the screen, revoluble fan blades disposed interiorly of the screen for creating a draft co-operating with the disks in driving the siftable substance through the screen, and revoluble brushes within the screen for movement over the entire inner surface of the screen.

In witness whereof, I have hereunto subscribed my name this 8th day of May, 1920.

SIGMUND SCHIFF.

Certificate of Correction.

It is hereby certified that in Letters Patent No. 1,538,356, granted May 19, 1925, upon the application of Sigmund Schiff, of Cincinnati, Ohio, for an improvement in " Centrifugal Sifters," an error appears in the printed specification requiring correction as follows: Page 4, line 78, claim 3, strike out the words " in lieu thereof"; and that the said Letters Patent should be read with this correction therein that the same may conform to the record of the case in the Patent Office.

Signed and sealed this 30th day of June, A. D. 1925.

[SEAL.] KARL FENNING,
*Acting Commissioner of Patents.*